Nov. 13, 1934.  J. BRETON  1,980,469
DEVICE FOR CONTROLLING THE ACTION OF A FLUID
Filed Jan. 11, 1933   5 Sheets-Sheet 1
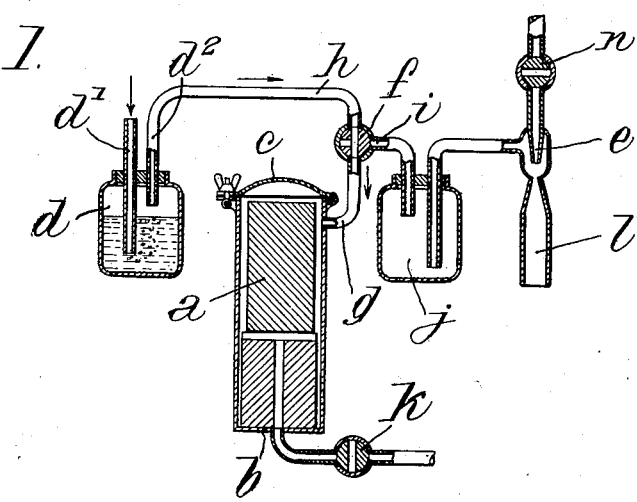
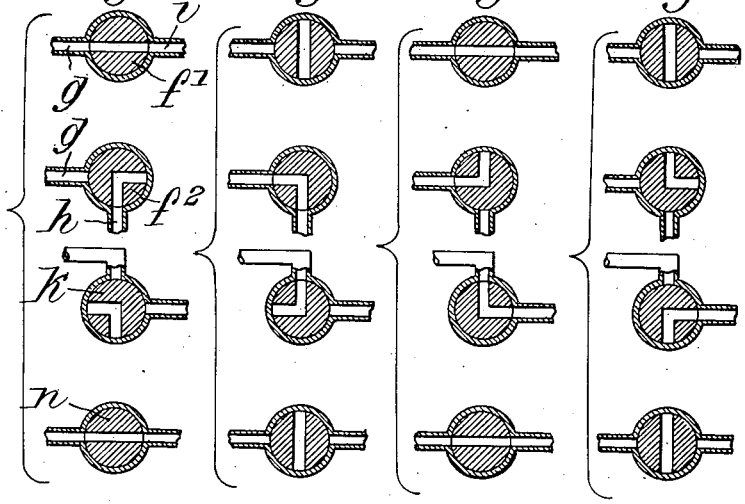
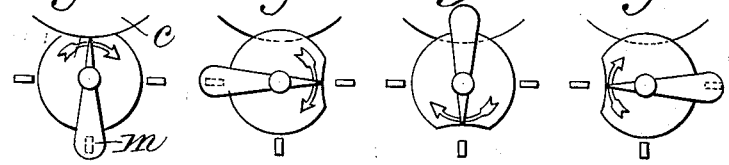

Nov. 13, 1934.   J. BRETON   1,980,469
DEVICE FOR CONTROLLING THE ACTION OF A FLUID
Filed Jan. 11, 1933   5 Sheets-Sheet 2
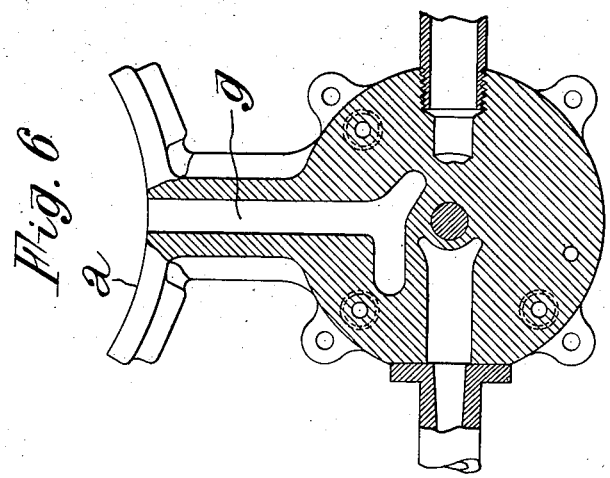
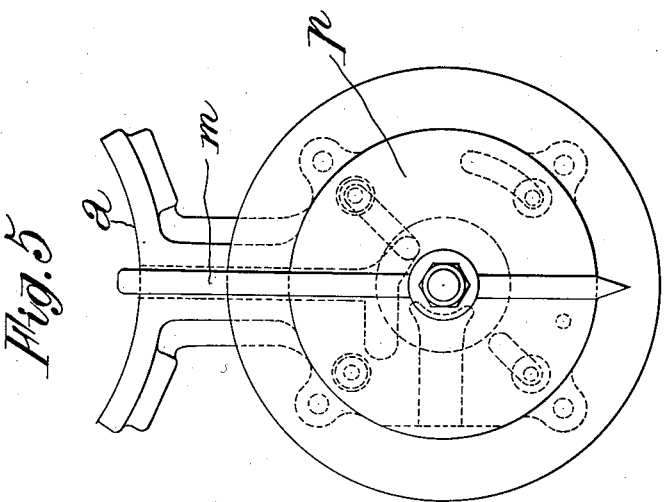
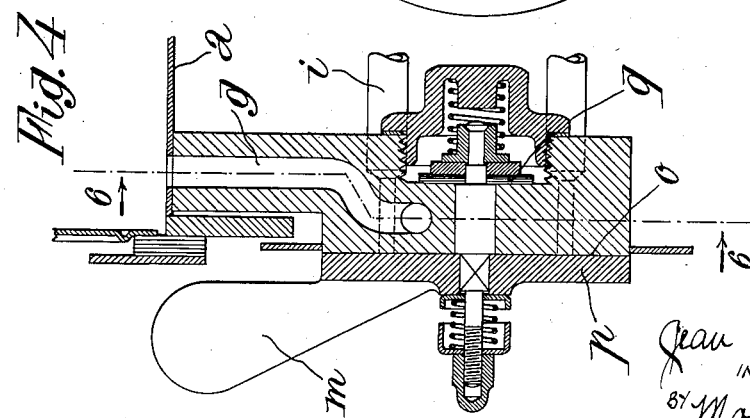

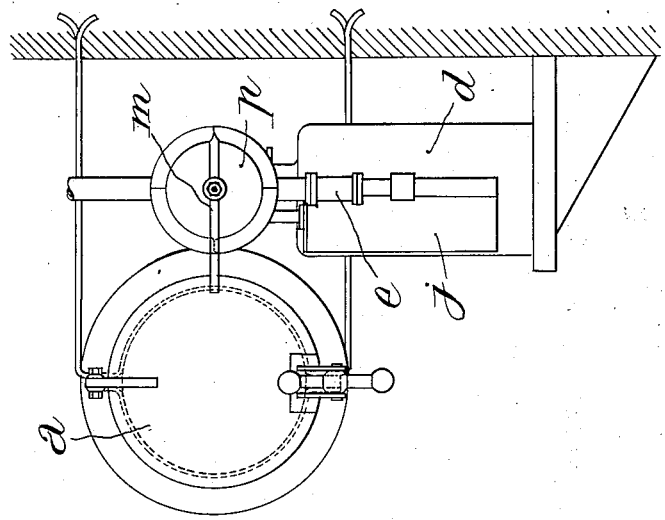
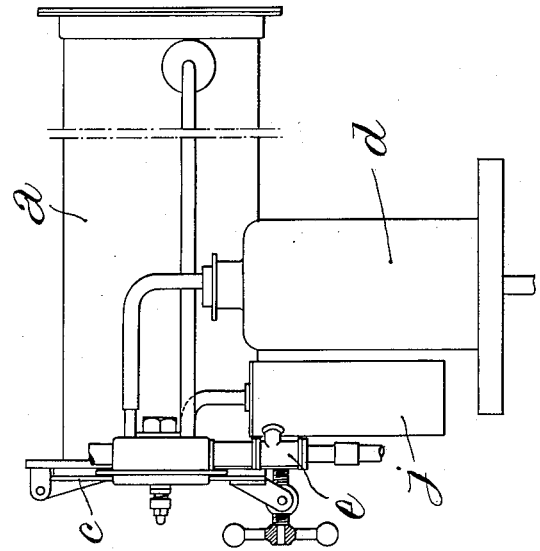
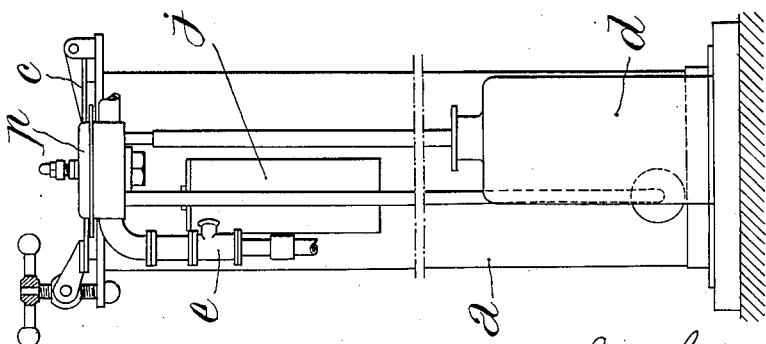

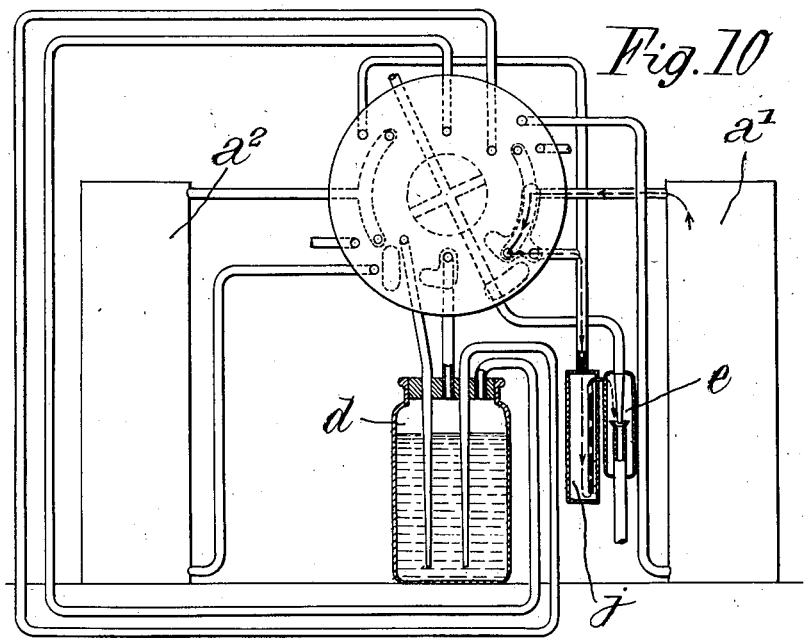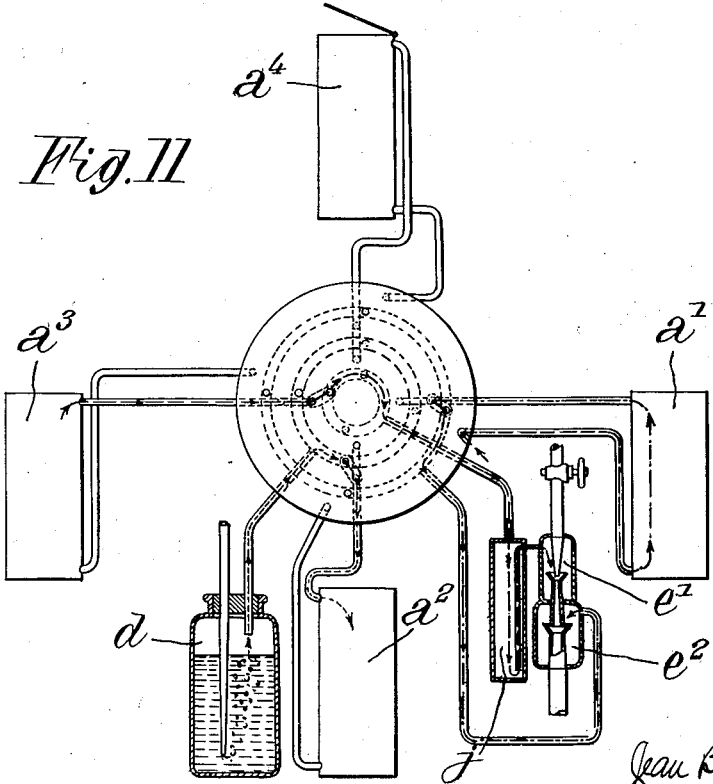

Nov. 13, 1934.    J. BRETON    1,980,469
DEVICE FOR CONTROLLING THE ACTION OF A FLUID
Filed Jan. 11, 1933    5 Sheets-Sheet 5
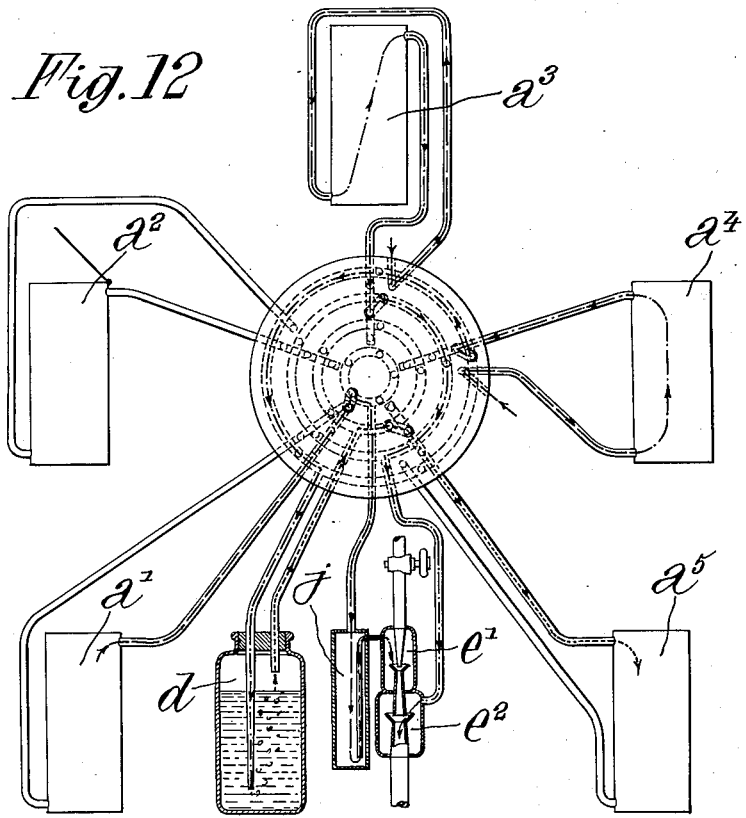
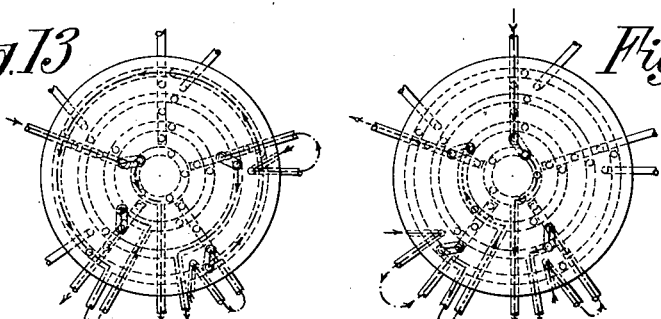
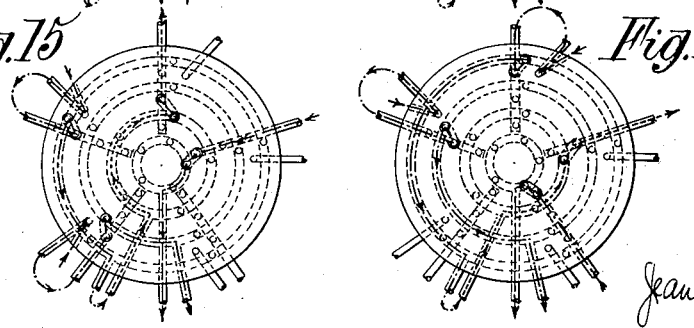

Patented Nov. 13, 1934

1,980,469

UNITED STATES PATENT OFFICE 1,980,469

DEVICE FOR CONTROLLING THE ACTION OF A FLUID

Jean Breton, Bellevue, France

Application January 11, 1933, Serial No. 651,125
In France January 16, 1932

20 Claims. (Cl. 95—89)

My invention relates to devices for controlling the action of a fluid and more particularly, but not exclusively, to devices for the development of photographic papers by means of ammonia.

The chief object of my invention is to provide a device of that type that is better adapted to the requirements of practice than apparatus known at the present time.

According to my invention, the fluid to be controlled is a gas soluble in water, and in order to produce the necessary displacements of said gas a vacuum water trompe is made use of for generating the necessary vacuum.

Another object of my invention is to provide, in apparatus of any kind including water trompes, an arrangement for obtaining, either simultaneously or not, on the one hand a vacuum to a degree analogous to that supplied by an ordinary water trompe, and on the other hand a lower, but more quickly obtained, vacuum. To this effect, according to my invention, I make use of two water trompes arranged in series, the second one having larger dimensions than the one with the outlet of which it is connected, each of said pumps being connected with a distinct vacuum pipe.

Another object of my invention is to provide, in apparatus including a chamber in which the gas to be made use of is allowed to act, a device for adjusting the capacity of said chamber to the actual requirements of the system. According to my invention, I obtain this result by making use of removable cores which permit to reduce the capacity of said chamber to the desired volume.

Preferred embodiments of my invention will be hereinafter described, with reference to the accompanying drawings, given merely by way of example, and in which:

Fig. 1 is a diagrammatic sectional view of an apparatus according to my invention for the development of photographic papers by means of ammonia;

Fig. 2 is a diagrammatic sectional view, representing the positions of the four two-way valves $f'$, $f^2$, $k$ and $n$, when the conduits $g$ and $i$ are connected so that a vacuum is produced in the cylinder $a$.

Fig. 2a is a view similar to Fig. 2, showing the positions of said four valves when the conduits $g$ and $h$ are connected, so that ammonia is caused to enter the cylinder $a$.

Fig. 2b is a view similar to Fig. 2, showing the positions of said four valves when the conduits $g$ and $h$ are again connected, so as to produce a partial vacuum in the cylinder $a$, while admitting air into the cylinder $a$ through the pipe controlled by valve $k$.

Fig. 2c is a view corresponding to Fig. 2, showing the positions to which said four valves are moved subsequent to the completion of the third step.

Figs. 3, 3a, 3b and 3c correspond respectively to Figs. 2, 2a, 2b and 2c so that Figs. 3–3c inclusive show the respective positions of the common operating handle $m$ which is used for actuating said four valves.

Figs. 4 to 6 inclusive show, in axial sectional view, in plan view, and in sectional view on the line 6—6 of Fig. 4, respectively, a multiple valve for use in connection with an apparatus of the type disclosed in Fig. 1;

Fig. 7 is an elevational view of an apparatus of the same kind as that shown in Fig. 1;

Fig. 8 is an elevational view of still another apparatus of the same kind as that shown in Fig. 1;

Fig. 9 is an end view of the apparatus shown in Fig. 8;

Fig. 10 is a diagrammatical view of an apparatus according to my invention comprising two development chambers;

Fig. 11 is a diagrammatical view of an apparatus according to my invention comprising four development chambers;

Fig. 12 is a diagrammatical view of an apparatus according to my invention comprising five development chambers; and Figs. 13 to 16 show diagrammatically four of the positions of a multiple valve provided in the apparatus according to Fig. 12.

As shown in the drawings, an apparatus for the development of photographic papers by means of ammonia according to my invention is made as follows:

On a support of any suitable kind I provide a chamber devised in such manner that it can be either closed or open to the outside.

Said chamber may for instance consist of an iron cylinder $a$, preferably provided with a peephole, and which may be disposed either vertically or horizontally. One of the ends of said cylinder is provided with a fixed plate $b$, and the other end is provided with a removable fluidtight cover $c$, for instance of the type usually employed in autoclaves (Fig. 1).

In order to supply the ammonia necessary for the development, I provide a washer $d$ adapted to contain ammoniacal water and which comprises an inlet orifice $d^1$ and an outlet orifice $d^2$ for the outlet of air charged with ammonia through its having bubbled through the ammoniacal water.

Cylinder $a$ can be connected either with tank $d$, or with a vacuum water trompe, the connections being controlled by means of a three way cock $f$ adapted to connect a conduit $g$ opening into cylinder $a$ either with a conduit $h$ leading to washer $d$ or with a conduit $i$ leading to vacuum water trompe $e$.

Preferably, I insert on conduit $i$ a safety vessel $j$ of the type generally provided in connection with water trompes so as to prevent the inflow of water toward cylinder $a$ in the case of a decrease in the pressure of the water supplied to the pump.

The operation of the device just above described is as follows:

Cylinder $a$ being open, the paper to be developed is placed therein, and the cylinder is then closed.

Cock $f$ is then placed in such a position that conduits $g$ and $i$ are connected together, and the water trompe is caused to operate, thus producing a partial vacuum in cylinder $a$.

Cock $f$ is then brought into a position such that conduits $g$ and $h$ are connected together, so that air can be drawn through washer $d$ into cylinder $a$, said air being charged with ammonia when it passes through said washer.

When the development is ended, cock $f$ is again moved so as to connect together conduits $g$ and $i$, whereby the trompe exhausts cylinder $a$ and evacuates the air charged with ammonia present in said cylinder. The scavenging of cylinder $a$ will be still more complete if air from the outside is allowed to penetrate into cylinder $a$ while trompe $e$ is connected therewith. This can be obtained by slightly opening cover $c$ of said cylinder. However it is preferable to this effect to provide a device comprising a cock $k$ for connecting the inside of said cylinder with the atmosphere when it is desired, the conduit on which said cock $k$ is inserted opening preferably into cylinder $a$ at a point thereof that is as far as possible from the point at which conduit $g$ opens into said cylinder $a$.

Anyway, the ammonia that is drawn from cylinder $a$ is dissolved in the water that passes through the trompe and it is carried along through outlet conduit $l$, which does away with the necessity of providing a special means for ventilating the room in which the apparatus is placed and also dispenses with the necessity of providing a conduit for the discharge of the ammonia to the outside.

It will readily be understood that the apparatus that has just been described is extremely simple and very little expensive. For instance, washer $d$ may consist, as in most chemical laboratories, of a mere bottle provided with a stopper through which extend glass tubes of different lengths, as shown in Fig. 1.

Of course, the means for connecting together at the proper time the conduits above mentioned, and which have been described as consisting of three way cock $f$ and ordinary cock $k$, may be made in any other suitable manner.

Furthermore, said means may be established in such manner that their operation is controlled through a single operating handle $m$ capable of occupying several well determined positions, each of which corresponds to a given step of the operation of the apparatus, said steps being four in number, to wit:

(a) The creating of a partial vacuum in cylinder $a$;

(b) The inflow of ammonia into cylinder $a$ and the developing of the paper present therein;

(c) The scavenging of the cylinder;

(d) The opening of said cylinder.

Of course, said handle $m$ may be connected to the means, such as cock $n$, for controlling the flow of water through the trompe, in such manner that said flow only takes place when it is necessary, that is while the vacuum is being created and during the scavenging step.

It will be readily understood that the various valves or cocks that have just been mentioned could be combined into a single organ in many different ways.

I may for instance provide, for controlling the operation of the apparatus according to my invention, four cocks, each of which is merely a two way cock, which are disposed coaxially in line with one another, as diagrammatically shown in Fig. 2.

The first cock, $f^1$, controls the communication between conduits $g$ and $i$.

The second cock $f^2$ controls the communication between conduits $g$ and $h$. The whole of said two cocks $f^1$ and $f^2$ corresponds exactly to the three way cock $f$ above referred to;

The third cock $k$ controls the communication between the atmosphere and the inside of cylinder $a$.

The fourth cock $n$ controls the communication between a feed pipe containing water under pressure and water trompe $e$.

The respective positions of said cocks are adjusted relatively to one another in such manner that:

For a first position of handle $m$, only conduits $i$ and $g$ are connected together, and water is allowed to flow through the trompe;

For a second position of said handle $m$ (preferably at right angles to the first position), only conduits $g$ and $h$ are connected with each other;

For a third position, conduits $g$ and $i$ are connected with each other, while cocks $k$ and $n$ are open; and For a fourth position, all the connections are cut off.

The arrangement thus devised is extremely simple and very safe since it entirely prevents any mistake in the operation of the different cocks.

The safety of operation might be further increased by providing an arrangement such that cylinder $a$ cannot be opened as long as handle $m$ does not occupy the position that corresponds to the closing of all the cocks. Such an arrangement is shown in Fig. 3. It comprises a disk $m^1$ the outline of which is such that its edge extends over the edge of cover $c$ and thus prevents the opening thereof. A notch provided in said disk $m^1$ is adapted to register with the outline of cover $c$ only when handle $m$ is in the desired position so that cover $c$ can then be removed.

Of course, according to another embodiment of my invention, the various cocks above referred to may be combined into a single unit, forming a multiple cock. Such an arrangement is shown in Figs. 4 to 6.

The multiple valve comprises, on the one hand a stationary plate $o$ provided with suitable ports connected with the conduits to be connected together as above explained, and on the other hand a movable plate $p$ connected with handle $m$ and adapted to rotate with respect to said stationary plate $o$. Plate $p$ is provided with recesses the shape and the position of which are so devised that for given positions of the movable plate with respect to the stationary plate, the desired connections are established. A membrane cock $q$ adapted to rotate together with movable plate $p$ is fitted in the piece that carries the stationary plate $o$. Said cock controls the flow of water toward the trompe so as to stop it for certain positions of the movable plate. (The last mentioned cock is made according to my French patent application Ser. No. 341,618, filed Oct. 22, 1932.)

When the connections between the various pipes are controlled through the arrangement that has just been described, the whole of the apparatus can be established in a particularly simple manner, as shown for instance in the embodiments of Figs. 7 to 9.

In the embodiment of Fig. 7, cylinder $a$ is vertically disposed on a support on which is also disposed washer $d$. Safety tank $j$ and the vertical valve above described are fixed to the upper part of said cylinder.

In the embodiment of Figs. 8 and 9, cylinder $a$ is horizontally disposed, being for instance sealed to a wall or any other suitable support. Safety tank $j$, washer $d$ and the multiple valve are fixed in the vicinity of the removable end of said cylinder.

In the preceding description I have considered only the case of an apparatus including a single developing cylinder, but it will readily be understood that the apparatus according to my invention might comprise a plurality of such cylinders.

In this case, I may apply a particularly simple method of partly recovering the ammonia by arranging the apparatus in such manner that while ammonia is allowed to enter into one of the cylinders, the air admitted into the washer, instead of being taken directly from the atmosphere, is drawn from another cylinder, in which the developing is finished and the scavenging operation is started.

I may for instance carry out that method by means of an apparatus including two cylinders $a^1$, $a^2$, of the type shown in Fig. 10.

If I provide said apparatus with a multiple valve analogous to that above described with reference to Figs. 4 to 6, said apparatus shall have to be so connected with the valve and the valve so arranged that the handle of said valve may occupy eight different positions.

For the first position, a vacuum is created in cylinder $a^1$;

For the second position, ammonia enters said cylinder, the air admitted into the washer coming from cylinder $a^2$;

The third position corresponds to the scavenging of the ammonia remaining in cylinder $a^2$;

For the fourth position, cylinder $a^2$ is opened;

For the fifth position, a vacuum is created in cylinder $a^2$;

For the sixth position of the handle, ammonia enters said cylinder $a^2$, the air admitted into the washer coming from cylinder $a^1$;

The seventh position corresponds to the scavenging of the ammonia remaining in cylinder $a^1$; and The eighth position corresponds to the opening of said cylinder $a^1$.

It will readily be understood that the recovery process that has just been described makes it possible to reduce to a considerable degree the total consumption of ammonia, since, after the developing in one cylinder, the gas that is contained therein passes through the washer instead of being brought directly to the water tromp, as was the case with the simplified apparatus that were above described.

According to another embodiment of my invention, instead of utilizing a single water trompe for both creating a partial vacuum in cylinders $a$ and ensuring the scavenging of said cylinders, I make use, for the same purpose of two trompes $e^1$, $e^2$ (Figs. 11 and 12) arranged in series, the second one $e^2$ being of a larger size than the other one with the outlet of which it is connected. Each of said trompes is connected to a distinct vacuum pipe and said pipes are alternately connected with cylinders $a$, trompe $e^1$ being connected with cylinders when a vacuum is to be created therein, while the larger trompe, $e^6$ is connected with said cylinders during the period that corresponds to the scavenging.

It will readily be understood that the smaller trompe $e^1$ makes it possible to obtain a relatively high vacuum, while the other one, on the contrary, makes it possible to obtain a lower vacuum, but which can be obtained more rapidly.

While the use of two trompes arranged in series is already interesting in apparatus having a single cylinder, it is more particularly advantageous in apparatus having multiple cylinders.

It will then be possible to cause the period of creation of a vacuum in one cylinder to coincide with the period of scavenging in another cylinder. Consequently, while the smaller trompe will exhaust the air contained in the first cylinder, the second trompe, which is fed with the mixture of water and air from the first trompe, will produce, under a low vacuum, a large flow of scavenging air through the second cylinder.

In order to obtain a continuous operation, with a minimum loss of time for the person that works the apparatus, it is advantageous to provide the apparatus with four cylinders. The apparatus will then be provided with a multiple valve the handle of which can occupy four positions, in such manner that, for each position of said handle, a cylinder is open, another one is being exhausted, a third one is being scavenged, and the developing is being performed in a fourth one (Fig. 11).

Of course, in this case also, I may make of the method of recovering ammonia that has been above described. It will suffice, for instance, to provide the apparatus with five cylinders $a^1$, $a^2$, $a^3$, $a^4$, $a^5$, instead of four (Figs. 12 to 16).

In the case of such an apparatus including five cylinders, it will be advantageous to make use of a valve the handle of which can occupy five distinct positions.

For one of said positions (Fig. 12), trompe $e^1$ creates a vacuum in cylinder $a^1$, cylinder $a^2$ is open, cylinder $a^3$ is connected with trompe $e^2$ and is being scavenged, cylinder $a^4$ is connected with the inlet of the washer, which therefore corresponds with the beginning of the scavenging period, and cylinder $a^5$, which has been previously exhausted, is connected with the outlet of the washer. The connections will be so established for each of the other positions (Figs. 13 to 16) that each cylinder passes successively, in the suitable order, through all the steps of the operation, the complete cycle corresponding to a whole turn of handle $m$.

Of course, in this case also the various cocks or similar organs can be made in any suitable manner. However, it will be particularly advantageous to make use of an arrangement similar to the one above described and in which a multiple valve is obtained by superposing a stationary plate provided with ports and a movable plate provided with recesses adapted to coact with said ports in order to establish the desired connections.

Preferably, the stationary plate consists of the combination of two juxtaposed elements. One of said elements (one of the faces of which forms the valve seat) is provided with passages extending throughout it and connected with at least some of said ports, the faces along which said two elements are in contact with each other being provided with grooves arranged in such manner that they suitably connect between them some of said ports.

According to another feature of my invention, I provide cores adapted to partly fill cylinders $a$ so as to reduce the capacity thereof, when it is not necessary to use the whole of said capacity.

Said cores are made in any suitable manner. They may for instance consist of metallic hollow bodies, preferably fluidtight. They can be so provided that they occupy the lower part of the cylinder $a$ (cores $t^1$, Fig. 1) this being particularly advantageous when it is desired to develop a great number of papers the size of which is so small that they do not occupy the whole height of the cylinder. I may also make use of a central core (such as $t^2$, Fig. 1) which leaves between itself and the wall of the cylinder a peripheral annular space, this type of core being especially adapted for the developing of a relatively small number of papers of large size.

Anyway, the presence of said cores considerably reduces the volume of the inner capacity of the cylinder and therefore reduces the consumption of ammonia and that of feed water for the trompe, or any other vacuum pump. It should be noted that said cores can perfectly well be utilized with apparatus in which the vacuum is created by means of any suitable device to this effect other than a trompe.

However, the utilization of such cores will be more particularly advantageous in the case of said vacuum being obtained by means of one or several trompes because it will then be possible to considerably reduce the consumption of said trompe or trompes.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. A device for controlling the action of a gas soluble in a liquid on an object, which comprises in combination, a vessel adapted to receive said object, means for closing said vessel in a fluidtight manner, a vacuum trompe worked by means of a liquid in which the gas in question is soluble, means for feeding said gas, and means for connecting said vessel alternately with said trompe and with said gas feeding means, whereby the trompe, when connected with said vessel, both exhaust the gas therefrom and dissolves said gas in the liquid above referred to.

2. A device for controlling the action of a gas soluble in a liquid on an object, which comprises in combination, a vessel adapted to receive said object, means for closing said vessel in a fluidtight manner, a washer filled with a solution of said gas in a liquid, an inlet pipe for said washer, an outlet pipe for said washer, a vacuum trompe worked by means of a liquid in which the gas in question is soluble, and means for alternately connecting said vessel with said outlet pipe of the washer and with said trompe.

3. A device for developing exposed photosensitive paper by the use of ammonia or other equivalent gas, which comprises in combination, a cylinder adapted to receive the exposed photosensitive paper, a washer filled with a solution of ammonia in water, an inlet conduit for said washer, an outlet conduit for said washer, a vacuum water trompe, and valve means for alternately connecting said cylinder with said washer and with said trompe.

4. A device for developing exposed photosensitive paper by the use of ammonia or other equivalent gas which comprises in combination, a cylinder adapted to receive the exposed photosensitive paper, a conduit opening into said cylinder, a washer filled with a solution of ammonia in water, an inlet conduit for said washer, an outlet conduit for said washer, a vacuum water trompe, a conduit connected with said trompe, valve means for connecting the first mentioned conduit either with the outlet conduit of the washer, or with the conduit connected with said trompe, valve means for admitting fresh air into said cylinder, and valve means for controlling the flow of water through said trompe.

5. A device for developing exposed photosensitive paper by the use of ammonia or other equivalent gas which comprises in combination, a cylinder adapted to receive the exposed photosensitive paper, a conduit opening into said cylinder, a washer filled with a solution of ammonia in water, an inlet conduit for said washer, an outlet conduit for said washer, a vacuum water trompe, a conduit connected with said trompe, valve means for connecting the first mentioned conduit either with the outlet conduit of the washer, or with the conduit connected with said trompe, valve means for admitting fresh air into said cylinder, valve means for controlling the flow of water through said trompe, and operating means for controlling all of said valve means simultaneously.

6. A device for developing exposed photosensitive paper by the use of ammonia or other equivalent gas which comprises in combination, a cylinder adapted to receive the exposed photosensitive paper, a conduit opening into said cylinder, a washer filled with a solution of ammonia in water, an outlet conduit for said washer, a vacuum water trompe, a conduit connected with said trompe, a conduit opening into said cylinder, a two way cock for connecting together the two first mentioned conduits, a two way cock for connecting together the first and the third mentioned conduit, a two way cock for controlling the flow of air through the fourth mentioned conduit, a two way cock for controlling the flow of water through said trompe, all of said cocks being placed in line with one another, and a handle for simultaneously controlling all of said cocks.

7. A device according to claim 6 further comprising a disc carried by said handle and provided with a slot for permitting the removal of the cover of the cylinder only for one position thereof.

8. A device according to claim 4 in which all the valve means are combined into a single unit forming a multiple valve said multiple valve comprising in combination, a stationary plate provided with ports connected with said conduits respectively, and a movable plate adapted to rotate with respect to the first one, and the face of which that is in contact with said stationary plate is provided with recesses.

9. A device for developing exposed photosensitive paper by the use of ammonia or other equivalent gas which comprises in combination, two cylinders adapted to receive exposed photosensitive papers, means for closing said cylinders in a fluidtight manner, a washer filled with a solution of ammonia in water, an inlet conduit for said washer, an outlet conduit for said washer, means for connecting said inlet conduit with either of the cylinders alternately and simultaneously connecting the outlet conduit with the other cylinder, a water trompe and means for alternately connecting either of said cylinders with said trompe.

10. A device for developing exposed photosensitive paper by the use of ammonia or other equivalent gas which comprises in combination, a cylinder adapted to receive the exposed photosensitive paper, means for closing said cylinder in a fluidtight manner, a conduit opening into said cylinder, a washer filled with a solution of ammonia in water, an inlet conduit for said washer, an outlet conduit for said washer, two water trompes arranged in series, the second one being of larger size than the first one, valve means for connecting the first mentioned conduit successively with the first trompe, with the outlet conduit of the washer, and with the second trompe, and valve means for admitting fresh air into said cylinder when the first mentioned conduit is connected with the second trompe.

11. A device for developing exposed photosensitive paper by the use of ammonia or other equivalent gas which comprises in combination, two cylinders adapted to receive exposed photosensitive papers, a washer filled with a solution of ammonia in water, an inlet conduit for said washer, an outlet conduit for said washer, means for connecting said inlet conduit with either of the cylinders alternately and simultaneously connecting the outlet conduit with the other cylinders, two water trompes arranged in series the second one being of larger size than the first one, and means for alternately connecting each of said trompes with each of said cylinders respectively.

12. A device for developing exposed photosensitive paper by the use of ammonia or other equivalent gas which comprises in combination four cylinders adapted to receive exposed photosensitive papers, means for closing said cylinders in a fluidtight manner, a washer filled with a solution of ammonia in water, an inlet conduit for said washer, an outlet conduit for said washer, means for successively connecting each of said cylinders with said outlet conduit, two water trompes arranged in series, the second one being of larger size than the first one, and means for successively connecting one of said cylinders with the larger trompe and the other cylinder with the smaller trompe.

13. A device for developing exposed photosensitive paper by the use of ammonia or other equivalent gas which comprises in combination five cylinders adapted to receive exposed photosensitive papers, means for closing said cylinders in a fluidtight manner, a washer filled with a solution of ammonia in water, an inlet pipe for said washer, an outlet pipe for said washer, means for simultaneously connecting said inlet pipe with one of said cylinders and said outlet pipe with another cylinder, two water trompes arranged in series, the second one being of larger size than the first one, and means for simultaneously connecting one of said trompes with one cylinder and the other trompe with another cylinder.

14. A device for developing exposed photosensitive paper by the use of ammonia or other equivalent gas, which comprises in combination, a cylinder adapted to receive the exposed photosensitive paper, a conduit opening into said cylinder, means for feeding ammonia, a vacuum water trompe, a conduit connected with said trompe, valve means for connecting the first mentioned conduit either with said ammonia feeding means or with the second mentioned conduit, valve means for admitting fresh air into said cylinder, and valve means for controlling the flow of water through said trompe.

15. A device for developing exposed photosensitive paper by the use of ammonia or another equivalent gas, which comprises in combination, a cylinder adapted to receive the exposed photosensitive paper, a conduit opening into said cylinder close to one end thereof, means for feeding ammonia, a vacuum water trompe, a conduit connected with said trompe, valve means for connecting the first mentioned conduit either with said ammonia feeding means or with the second mentioned conduit, valve means for admitting fresh air into said cylinder at the other end thereof, valve means for controlling the flow of air through said trompe, and operating means for controlling all of said valve means simultaneously.

16. A device for developing exposed photosensitive paper by the use of ammonia or any other equivalent gas, which comprises in combination, a cylinder adapted to receive the exposed photosensitive paper, a conduit opening into said cylinder, means for feeding ammonia, an outlet conduit for said means, a vacuum water trompe, a conduit connected with said trompe, a conduit opening into said cylinder, a two way cock for connecting together the two first mentioned conduits, a two way cock for connecting together the first and the third mentioned conduits, a two way cock for controlling the flow of air through the fourth mentioned conduit, a two way cock for controlling the flow of air through said trompe, all of said cocks being placed in line with one another, and a handle for simultaneously controlling all of said cocks.

17. A device according to claim 16 further comprising a disc carried by said handle and provided with a slot for permitting the removal of the cover of the cylinder only for one position thereof.

18. A device according to claim 14 in which all the valve means are combined into a single unit forming a multiple valve, said multiple valve comprising in combination, a stationary plate provided with ports connected with said conduits respectively, and a movable plate adapted to rotate with respect to the first one, and the face of which that is in contact with said stationary plate is provided with recesses.

19. A device for developing exposed photosensitive paper by the use of ammonia or any other equivalent gas, which comprises in combination, a cylinder adapted to receive the exposed photosensitive paper, means for closing said cylinder in a fluidtight manner, a conduit opening into said cylinder close to one end thereof, means for feeding ammonia, an outlet conduit for said last mentioned means, two water trompes arranged in series, the second one being of larger size than the first one, valve means for connecting the first mentioned conduit successively with the first trompe, with the outlet conduit of said ammonia feeding means, and with the second trompe, and valve means for admitting fresh air into said cylinder at the other end thereof when the first mentioned conduit is connected with the second trompe.

20. A device for developing exposed photosensitive paper by the use of ammonia or any other equivalent gas, which comprises in combination, four cylinders adapted to receive exposed photosensitive papers, means for closing said cylinders in a fluidtight manner, means for feeding ammonia, an outlet conduit for said ammonia feeding means, means for successively connecting each of said cylinders with said outlet conduit, two water trompes arranged in series, the second one being of larger size than the first one, and means for simultaneously connecting one of said cylinders with the larger trompe and the other cylinder with the smaller trompe.

JEAN BRETON.